June 25, 1929.  L. MAMBOURG  1,718,372
COOLER
Filed Aug. 18, 1925

INVENTOR.
Leopold Mambourg
Frank Fraser
ATTORNEY.

Patented June 25, 1929.

1,718,372

UNITED STATES PATENT OFFICE.

LEOPOLD MAMBOURG, OF LANCASTER, OHIO, ASSIGNOR TO THE LIBBEY-OWENS SHEET GLASS COMPANY, OF TOLEDO, OHIO, A CORPORATION OF OHIO.

COOLER.

Application filed August 18, 1925. Serial No. 51,004.

This invention relates to an improved form of cooler or baffle for use in a sheet glass drawing apparatus.

An object of the present invention is to construct a cooler that will have a uniform cooling action on molten glass from which a sheet may be drawn.

Another object of the present invention is to improve the smoothness of the glass sheet with such a cooler. A further object of the invention is to provide means for baffling and cooling heated air currents escaping from the furnace and fire box. Other objects and advantages of this invention become apparent from the following detailed description of one approved form of cooler.

In the Colburn process of drawing sheet glass, set forth in U. S. Patent No. 1,248,809, is shown a pair of coolers, similar to those about to be described, having flat bottoms directly exposed to the molten glass passing thereunder but in spaced relation thereto. These coolers are constructed of thin sheet metal having a cooling medium circulated therethrough. It is found that the metal of which these coolers are constructed is wavy. This waviness of the metal in the bottoms of the coolers creates an uneven cooling or heat absorbing action on the molten glass passing thereunder, and it is believed causes a corrugated appearance in a sheet drawn from this glass. In order to remove the corrugations in the cooler bottoms, they were filed or planed flat, but this caused some parts of the metal to be thinner than others, which had the same resultant effect as the wavy bottom, namely, ununiform heat absorption.

In the case of the ordinary cooler placed close to the glass surface, the unevenness or waviness of the metal in the bottoms would tend toward building up individual groups of air columns of varying height which consequently vary in cooling intensity affecting the glass passing thereunder accordingly. By concaving or depressing the cooler bottoms, a more uniform cooling of the molten glass is attained. It is believed that the heat absorbing area of the concaved cooler bottom, which is more remote than before, tends to break up or diffuse these individual groups of air columns to the extent that no particular section of the cooler bottom absorbs heat from the section of molten glass lying in the same corresponding relationship thereto. An equivalent cooling intensity will prevail with this improved bottom as was necessary in the flat bottom, only softer and considerably more uniform.

Should any metal unevenness be apparent at the bottom edges of the concavity it can be removed by filing or machining the edges straight and even, without materially affecting the metal thickness in the cooler bottom. A cooler thus constructed, having true and smooth bottom edges, can be adjusted to its lowest possible normal position without any part thereof coming in contact with the molten glass thereunder. This positioning of the cooler shields the glass sheet being drawn from the highly heated gases escaping from the furnace or fire box.

It will be noted in the drawing that a greater heat absorbing area is attained with this improved bottom, without changing the general design of the coolers now in use.

It would be impossible to get the conditions mentioned above by merely raising the cooler shown in the Colburn process as the heated gases escaping from the furnace or fire-box would pass thereunder and greatly affect the chilling action for which the cooler is intended.

In the accompanying drawing, Fig. 1 is a sectional elevation of a sheet drawing apparatus, showing the coolers in place and in cross section.

Figure 1:
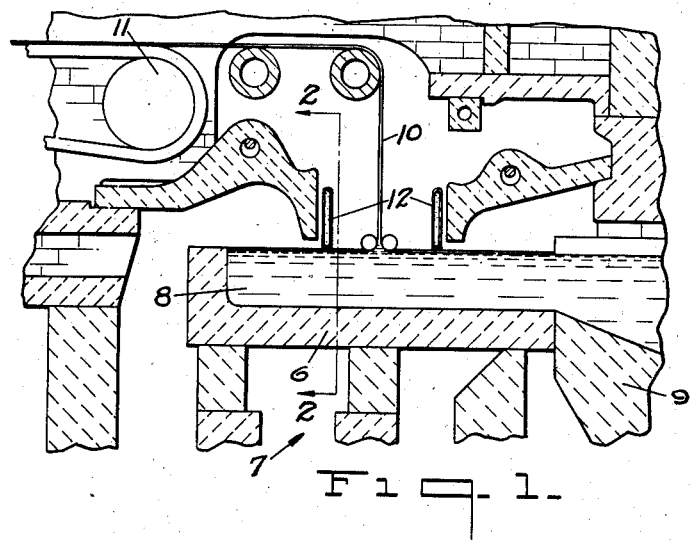
Figure 2:
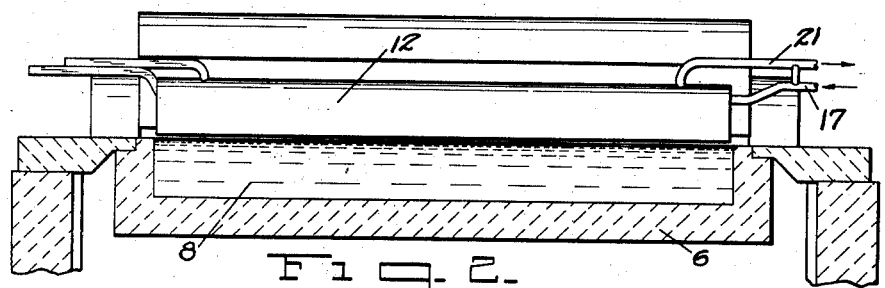
Fig. 2 is a transverse vertical section on line 2—2 of Fig. 1, showing one of the coolers in side elevation.

In Fig. 1 of the drawings 6 is a receptacle supported on a fire-box 7, and is supplied with molten glass 8 from the furnace 9. A sheet of glass 10 is drawn from the molten glass in the receptacle by the drawing mechanism 11. Located at each side of the sheet and near the surface of the molten glass are the coolers 12 which serve to protect the sheet from heated air currents escaping from the furnace and fire-box, and at the same time absorb sufficient heat from the glass passing thereunder to give it the proper viscosity to permit it to be drawn away in sheet form.

It will be noted that both coolers are identical in structure, so for the sake of briefness only one cooler will be described. The cooler is preferably made of sheet metal and is designed to form a hollow elongated casing, the sides 13 being straight and preferably parallel. The bottom 14 of the casing is concaved or depressed inwardly, forming a cavity 15 extending throughout the length of the cooler. The bottom 14 should be of equal metal thickness throughout. The transverse contour of the cavity 15 may be arcuate, parabolic, hyperbolic or angular, and is preferably disposed evenly within the side walls 13 of the casing, the deepest point thereof lying centrally between. The bottom edges 16 of the concavities are filed or machined off smooth and even. After being filed or machined off smooth and even both edges should be parallel, preferably lie in the same horizontal level plane and be the same perpendicular distance away from the glass level throughout the length of the casing. The casing may be internally cooled by circulating a suitable cooling medium therethrough, such as relatively cool water.

Figures 3, 4, 5:
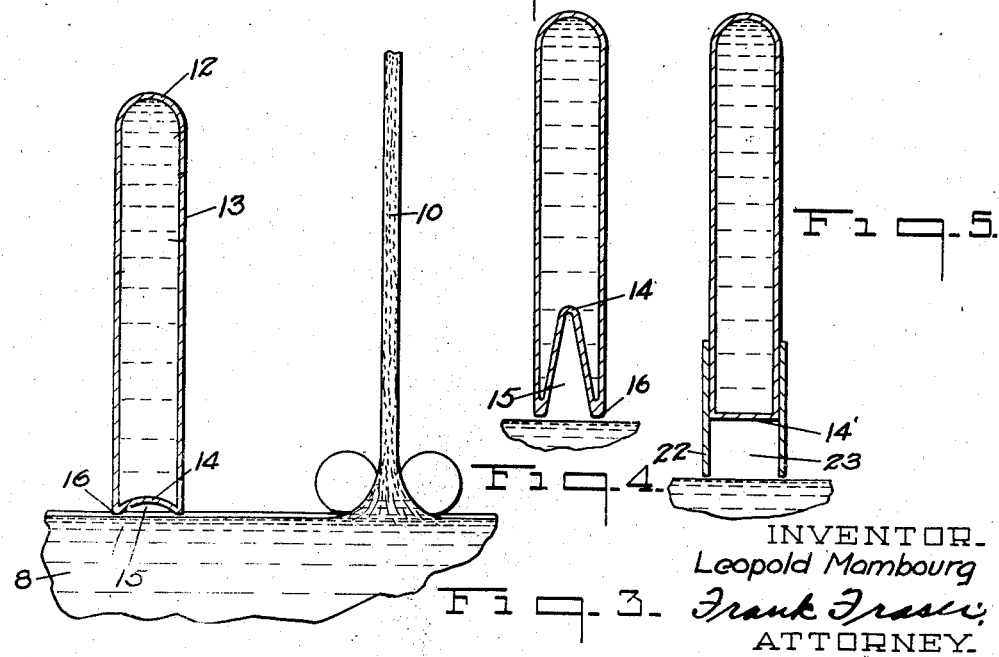
Fig. 3 is an enlarged section of the cooler shown in position.
Figs. 4 and 5 are sectional views of modifications of the cooler.

Any unequal heat absorption caused from the metal waviness in the ordinary cooler, having flat bottoms and located close to the glass surface, may be overcome by increasing the distance between the cooler bottom and the glass surface, and then adding longitudinal side wall extensions 22, shown in Fig. 5 of the drawing, extending downwardly to the level previously maintained by the cooler bottom. It will be noted that a cooler bottom of this construction maintains an air column of equal height within the space 23 formed by the side wall extensions 22 and the cooler bottom 14'. It may be found that this modification will function somewhat in the same manner as the cooler covered in the main embodiment of this invention.

In operation, the molten glass flows from the furnace and fills the shallow glass drawing receptacle. A relatively small area of the surface glass about the center of the receptacle is exposed to the atmosphere, and is further cooled uniformly by the depressed bottoms of the coolers just described, placed at the outer extremities thereof. It is from this uniformly cooled area that a sheet of glass of greater smoothness is drawn. Beginning at the time when the raw materials are put into the furnace the glass is under the influence of heat in some degree or other. From beneath the receptacle and from the furnace very highly heated gases escape, and it is here where the coolers just described efficiently function again to baffle and cool these heated gases and so prevent their damaging action on the formation of the sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A cooler of the class described, comprising a casing, sides extending below the bottom of said casing, and a means of directing a cooling medium through the casing.

2. A cooler of the class described, comprising an elongated casing, and a bottom having a concavity disposed between the side walls of the casing.

3. A cooler of the class described, comprising an elongated casing, and a bottom having a plane angular depression disposed between the side walls of the casing.

4. A cooler of the class described for use in sheet glass drawing apparatus, comprising a casing and a bottom having a concavity disposed between the side walls of the casing, said bottom being continuously cooled.

5. In a sheet glass drawing apparatus, comprising a receptacle supplied with molten glass, means to draw a sheet therefrom, and a cooler arranged at each side of the sheet, said coolers having bottoms remotely extending from, and side walls extending down to, the molten glass.

6. In a sheet glass drawing apparatus, a cooler of the class described, comprising a substantially rectangular casing, a bottom depressed within the side walls, the depression extending throughout the length of said casing, the edges of the casing being flat and being disposed in the same horizontal plane.

7. A cooler of the character described, comprising an elongated casing, and a concavity in its bottom wall extending substantially from one side edge thereof to the other.

8. A cooler of the character described, comprising an elongated casing having a transversely concaved bottom.

9. In sheet glass apparatus, a receptacle containing a supply of molten glass, and a cooler arranged thereabove, said cooler comprising a casing provided with a concavity in its bottom wall exposed to the molten glass.

Signed at Lancaster, in the county of Fairfield, and State of Ohio, this 10th day of August, 1925.

LEOPOLD MAMBOURG.